(12) United States Patent  
Zorzolo et al.

(10) Patent No.: US 8,033,146 B2  
(45) Date of Patent: Oct. 11, 2011

(54) CUTTING MACHINE, PARTICULARLY FOR LEATHER AND SIMILAR MATERIALS

(75) Inventors: Alessandro Zorzolo, Vigevano (IT); Stefano Zorzolo, Vigevano (IT)

(73) Assignee: Comelz S.p.A., Vigevano (IT)

( * ) Notice: Subject to any disclaimer, the term of this patent is extended or adjusted under 35 U.S.C. 154(b) by 0 days.

(21) Appl. No.: 12/450,428

(22) PCT Filed: Mar. 31, 2008

(86) PCT No.: PCT/IB2008/000803  
§ 371 (c)(1),  
(2), (4) Date: Sep. 25, 2009

(87) PCT Pub. No.: WO2008/120096  
PCT Pub. Date: Oct. 9, 2008

(65) Prior Publication Data  
US 2010/0043501 A1    Feb. 25, 2010

(30) Foreign Application Priority Data  
Apr. 3, 2007  (IT) .............................. MI2007A0684

(51) Int. Cl.  
*C14B 5/00*  (2006.01)
(52) U.S. Cl. ............................................................. 69/2
(58) Field of Classification Search .................. 69/2, 21  
See application file for complete search history.

(56) References Cited

U.S. PATENT DOCUMENTS

| 3,978,748 | A | * | 9/1976 | Leslie et al. ...................... 83/53 |
| 4,226,098 | A | * | 10/1980 | Alexander .......................... 69/2 |
| 6,155,245 | A | * | 12/2000 | Zanzuri ........................... 125/12 |

FOREIGN PATENT DOCUMENTS

EP   1 157 793 A   11/2001

* cited by examiner

*Primary Examiner* — Shaun R Hurley  
(74) *Attorney, Agent, or Firm* — Modiano & Associati; Albert Josif; Daniel O'Byrne

(57) ABSTRACT

A cutting machine, particularly for leather and similar materials, comprising a pair of shoulders which are connected by a system of guides arranged so as to lie above a conveyor belt, at least one cutting head being movable along the guide system, the movement of the cutting head in the same advancement direction as the conveyor belt and at right angles to the guide system being distributed on two or more elements, at least one of which is cantilevered.

5 Claims, 1 Drawing Sheet

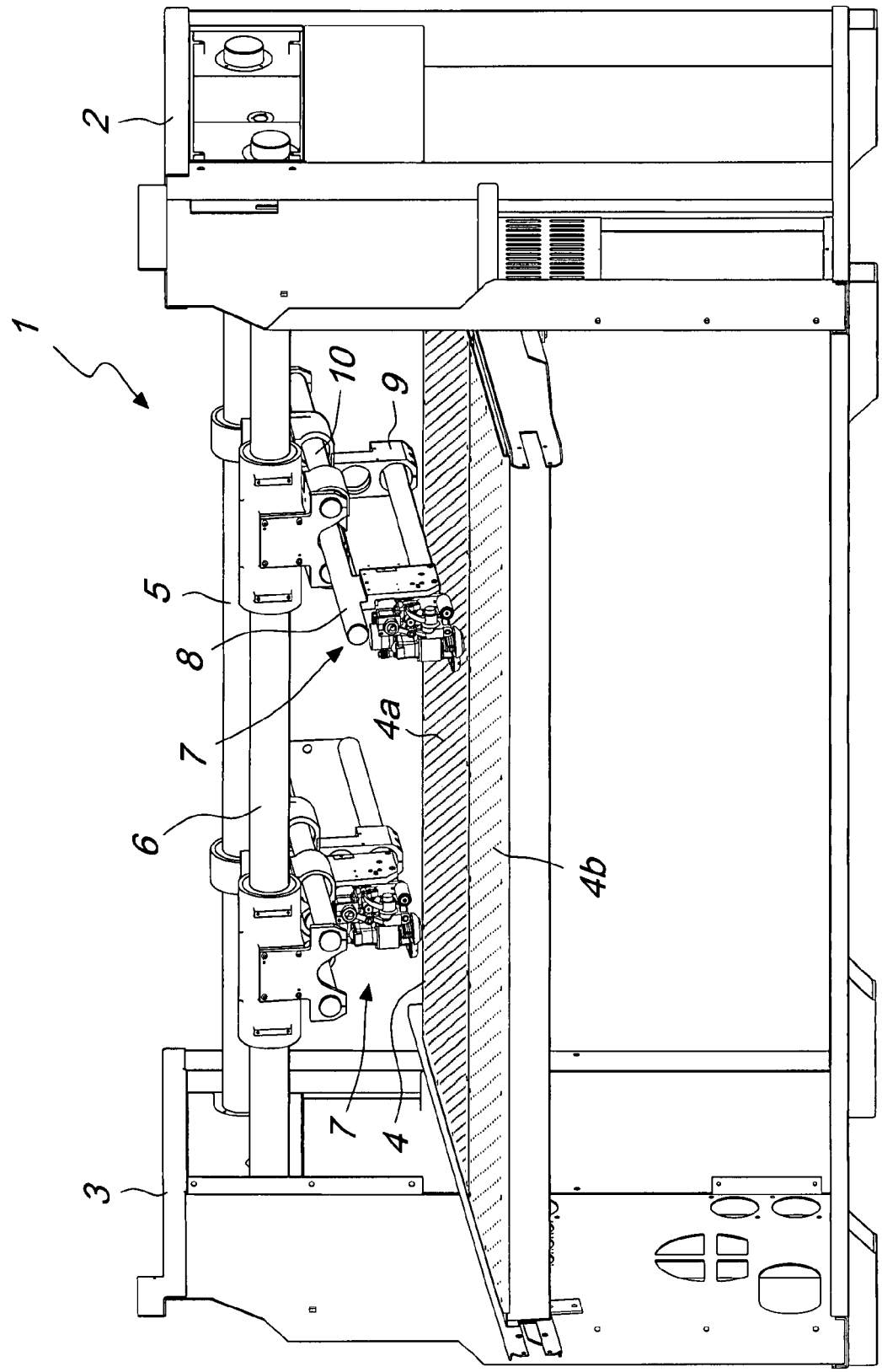

CUTTING MACHINE, PARTICULARLY FOR LEATHER AND SIMILAR MATERIALS

The present invention relates to a cutting machine, particularly for leather and similar materials. More particularly, the invention relates to a cutting machine provided with at least one cutting head which can move along two mutually perpendicular axes.

BACKGROUND OF THE INVENTION

As is known, cutting machines for leather and similar materials have a layout area, on which contours are arranged by projection, a cutting area, with one or more cutting heads, and finally an area for unloading the cut parts.

The mentioned areas lie along a conveyor belt on which the parts to be cut are arranged.

However, currently there are limitations as to the depth of the layout and to the cutting areas.

In known solutions, the cutting area is covered by two cutting heads, each of which is mounted so as to be jointly connected to the end of a system of guides which slides, in a cantilever arrangement along a longitudinal direction Y, i.e., transversely to the advancement direction of the belt, within a carriage which moves along beams in the transverse direction X.

This structure has the advantage of leaving clear the portion of the cutting area that is not occupied in each instant by the heads, allowing to surmount it with the layout area, in order to allow the operator greater closeness and visibility of the cutting area, which are required in order to keep control over any breakages or operating problems which require prompt intervention in order to limit damage to the process or to the very working parts of the machine.

However, the force of the cutting head on the plane during cutting imparts a vertical force to the guides along the direction Y, which generates a flexing thereof which increases as the cantilever with which the heads work increases, consequently degrading the quality and continuity of the cutting action. For this reason, the depth of the cantilever, and accordingly of the cutting area, has been contained within a level at which such flexing is acceptable, setting however limitations to the maximum depth of the parts that can be cut in a single pass (without pickups, which can cause problems in realignment precision) and forcing frequent interruptions of the cutting action to perform the advancement of the belt, to the detriment of productivity.

In another known type of solution, the cutting heads move along the direction Y along guides which are supported substantially at both ends and are connected to carriages for movement along the direction X.

This solution has the advantage of not having cantilever elements and of thus being able to cover a greater depth of the cutting area, with the advantage of being able to cut deeper parts without pickups and of consequently reducing the number of interruptions of the cutting process for belt advancement, improving productivity.

However, the presence of guides which are supported at both ends constitutes a space occupation which prevents the projection from surmounting the cutting area significantly. Since in order to take advantage of the entire depth of the cutting area it is necessary to have a layout area which has at least the same depth, the operator is at a considerable distance from the cutting area, thus losing the possibility to monitor effectively the cutting operations, where occasional breakages of tools, lifting of the material et cetera can cause damage to the process or to the cutting unit proper, which must be remedied promptly.

SUMMARY OF THE INVENTION

The aim of the present invention is to provide a cutting machine for leather and similar materials which provides a system which is sufficiently rigid to cover greater depths of area with respect to a system with cantilever cutting heads.

Within this aim, an object of the present invention is to provide a cutting machine for leather and similar materials which allows to minimize the space occupation of the carriages and allows to surmount the layout and cutting areas.

Another object of the present invention is to allow the layout of large parts which exceed the depth of the layout area alone, allowing the user to use in these cases the cutting area as a layout area.

Another object of the present invention is to provide a cutting machine for leather and similar materials in which the flexing due to loads on the cutting head is contained with respect to the total depth of the cutting area.

Still another object of the present invention is to provide a cutting machine for leather and similar materials which is highly reliable, relatively simple to provide and at competitive costs.

This aim and these and other objects, which will become better apparent hereinafter, are achieved by a cutting machine, particularly for leather and similar materials, comprising a pair of shoulders which are connected by a system of guides arranged so as to lie above a conveyor belt, at least one cutting head being movable along said guide system, characterized in that the movement of said cutting head in the same advancement direction as said conveyor belt and at right angles to said guide system is distributed on two or more elements, at least one of which is cantilevered.

BRIEF DESCRIPTION OF THE DRAWINGS

Further characteristics and advantages of the invention will become better apparent from the description of a preferred but not exclusive embodiment of the cutting machine according to the present invention, illustrated by way of non-limiting example in the only FIG. 1.

DESCRIPTION OF THE PREFERRED EMBODIMENTS

With reference to the figure, the cutting machine according to the present invention, generally designated by the reference numeral 1, comprises a machine frame constituted by a pair of shoulders 2 and 3, which are arranged so as to face each other and between which there is a conveyor belt (not shown in the figure) which can move transversely with respect to a pair of guides 5 and 6 which lie above the conveyor belt and are connected to the shoulders 2 and 3.

The conveyor belt surmounts a worktable 4 of the machine, which is divided into a cutting area 4a and a layout area 4b.

The cutting area 4a and the layout area 4b are connected to a suction tray, which is activated during work so as to create a suitable partial vacuum which is sufficient to keep the leather to be cut in position. The suction acts through holes, shown schematically in FIG. 1, whose distribution is denser in the cutting area 4a, so as to create a higher partial vacuum, and less dense in the layout area 4b, so as to create a smaller partial vacuum and facilitate the manual movement of the hides or of the material to be cut on the part of the operator.

At least one cutting head 7 is provided so that it can move along the pair of guides 5 and 6; conveniently, the cutting head 7 is mounted so as to be jointly connected at the end of a system of guides 8 which slides in the same advancement direction as the conveyor belt, i.e., along the axis Y, the axis Y being understood as the axis of advancement of the conveyor belt, the axis X being instead the axis along which the guides 5 and 6 are arranged.

Therefore, the head 7 is connected only to the guides 8, which constitute a first pair of guides, which can move along the axis Y and are mounted on a carriage 9 which can move, by means of a second pair of guides 10, again along the direction Y, with respect to the guides 5 and 6.

In turn, the carriage 9 (or rather, the pair of guides 10) can move along the pair of guides 5 and 6 in the direction X.

Therefore, the movement of the cutting head 7 along the direction Y is distributed over two or more telescopic elements, at least one of which, preferably the outermost one, is cantilevered, i.e., on two or more systems of guides.

In the figure, the guide systems shown are two in number, but there can be a plurality of guide systems, thus achieving an extension of the cutting head 7, i.e., a telescopic movement thereof along the direction Y.

This allows to provide a system which is sufficiently rigid to cover greater depths of area with a telescopic system which is partially cantilevered, minimizes the space occupation of the carriages and allows to surmount the layout and cutting areas, with the advantages mentioned earlier.

Moreover, the worktable on which the layout area 4b and the cutting area 4a are located can be conveniently slightly inclined, in order to further facilitate accessibility and visibility of the entire cutting area.

In practice it has been found that the cutting machine according to the invention fully achieves the aim of the invention, since it allows to increase the depth of the cutting area without increasing the flexing caused by loads on the cutting head and further allows the operator to place himself at a close distance from the cutting area, thus being able to monitor the cutting operations.

The machine thus conceived is susceptible of numerous modifications and variations, all of which are within the scope of the appended claims; all the details may further be replaced with other technically equivalent elements.

In practice, the materials used, as well as the contingent shapes and dimensions, may be any according to requirements and to the state of the art.

The disclosures in Italian Patent Application no. MI2007A000684, from which this application claims priority, are incorporated herein by reference.

The invention claimed is:

1. A cutting machine for leather and similar materials, comprising a pair of shoulders which are connected by a system of guides arranged so as to lie above a conveyor belt, at least one cutting head being movable along said guide system, wherein the movement of said cutting head in the same advancement direction as said conveyor belt and at right angles to said guide system is distributed on two or more elements, at least one of which is cantilevered, wherein said at least one cutting head is jointly connected to a first system of guides which can move along the same advancement direction as said conveyor belt, said first system of guides sliding with respect to a carriage which in turn can move along a second system of guides in the same direction as said cutting head, said carriage being connected to an additional carriage which can move along a direction which lies transversely to the advancement direction of said conveyor belt along said system of guides that connect said shoulders.

2. The cutting machine according to claim 1, wherein said cutting head is mounted substantially at the end of said first system of guides.

3. The cutting machine according to claim 1, wherein said first system of guides is constituted by pairs of guides and said second system of guides is constituted by a pair of guides.

4. The cutting machine according to claim 1, wherein said system of guides that connect said first and second shoulders comprises a pair of guides which are arranged transversely to the advancement direction of said conveyor belt.

5. The cutting machine according to claim 1, further comprising two cutting heads.

* * * * *